Figures 1, 5:
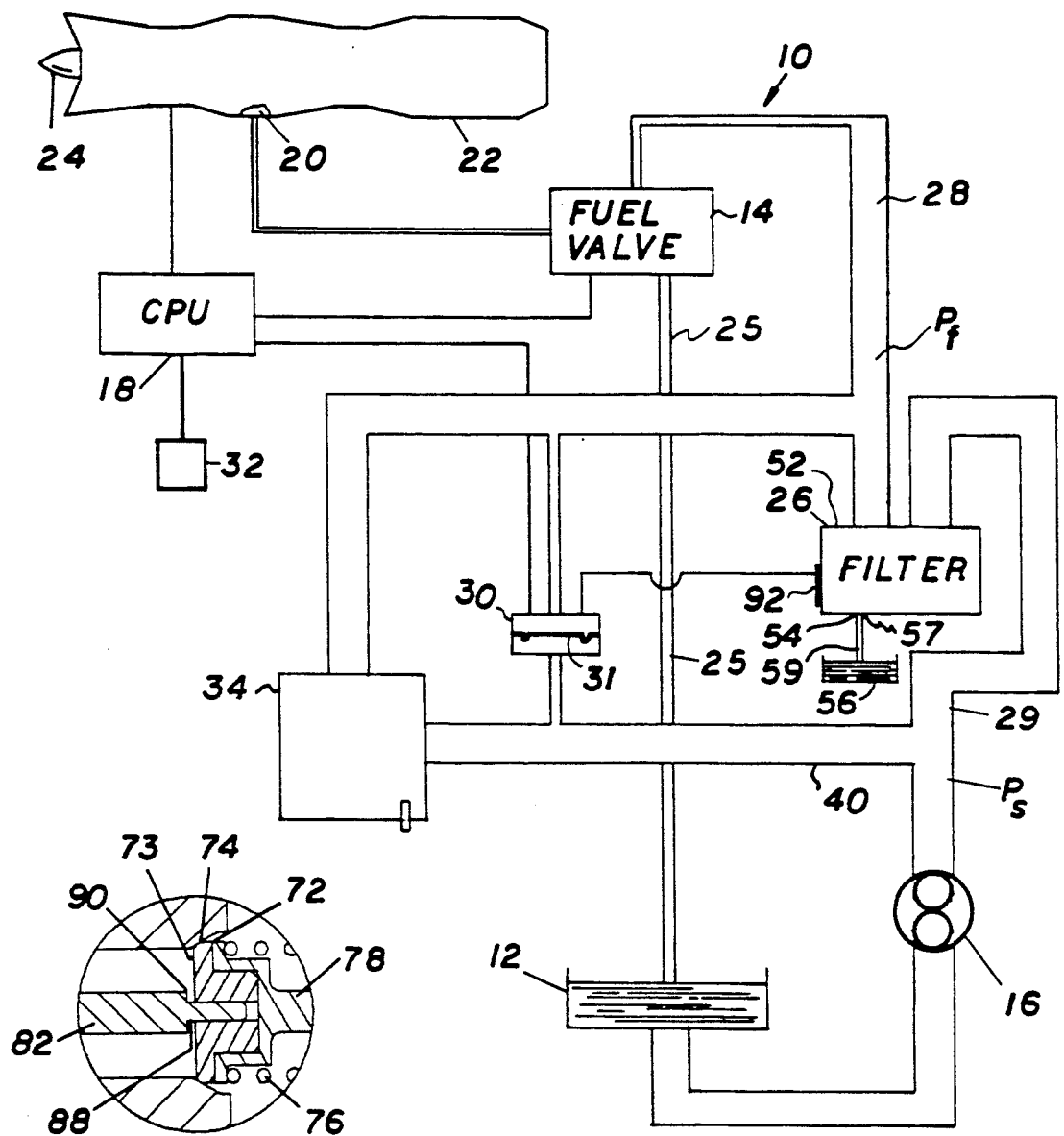

United States Patent [19]

Futa, Jr. et al.

[11] Patent Number: 5,132,009
[45] Date of Patent: Jul. 21, 1992

[54] FILTER FOR A FUEL SYSTEM

[75] Inventors: Paul W. Futa, Jr., North Liberty, Ind.; Francis A. Hamerly, Three Oaks, Mich.

[73] Assignee: Allied-Signal Inc., Morristown, N.J.

[21] Appl. No.: 484,291

[22] Filed: Feb. 26, 1990

[51] Int. Cl.$^5$ .............................................. B01D 35/14
[52] U.S. Cl. ...................... 210/90; 210/100; 210/232; 210/234; 210/235; 210/248; 210/418; 210/436
[58] Field of Search ................ 210/90, 100, 232, 234, 210/235, 248, 416.4, 418, 432, 436, 472; 60/39.091, 39.094, 734

[56] References Cited

U.S. PATENT DOCUMENTS

| | | |
|---|---|---|
| 2,945,591 | 7/1960 | Pall ........................ 210/234 |
| 2,955,712 | 10/1960 | Gutkowski ................ 210/234 |
| 3,363,762 | 1/1968 | Ensign ..................... 210/234 |
| 3,489,284 | 1/1970 | Pearce et al. ............ 210/234 |
| 4,245,462 | 1/1981 | McCombs ............... 60/39.141 |
| 4,426,284 | 1/1984 | Mitchell et al. ......... 210/234 |
| 4,654,140 | 3/1987 | Chen ........................ 210/90 |
| 4,818,397 | 4/1989 | Joy .......................... 210/432 |
| 4,824,564 | 4/1989 | Edwards et al. ......... 210/248 |
| 4,863,599 | 9/1989 | Guenther et al. ........ 210/248 |

FOREIGN PATENT DOCUMENTS 605522  9/1960  Canada ............................ 210/234

Primary Examiner—W. Gary Jones
Assistant Examiner—Matthew O. Savage
Attorney, Agent, or Firm—Leo H. McCormick, Jr.; Larry J. Palguta; Robert A. Walsh

[57] ABSTRACT

A filter arrangement (26) for a fuel system (10) having a cartridge (92) located in a bore (48) of a housing (42) for sequentially interruption flow communication from the bore (48) to a regulator (14) through an outlet port (44) and to the bore (48) through an inlet port (46) from a source (16) of fuel prior to the removal of the cartridge (94) from a housing (42). The housing (42) has a vent port (52) and a drain port (54) which are opened to allow fuel in the bore (48) to flow to a storage container (56) once the outlet (44) and inlet (46) ports are closed so that fuel is not lost from the fuel system (10) on the removal of the cartridge (94) from the bore (48).

8 Claims, 2 Drawing Sheets

FILTER FOR A FUEL SYSTEM

This invention relates to a filter arrangement a fuel system. On removal of the filter arrangement from the fuel system, flow communication to the system is interrupted and thereafter fuel in the filter is drained into a storage container to prevent air from entering the fuel system and fuel from being communicated into the surrounding environment.

In fuel systems it is important not to lose any fuel from the system when the filter is replaced since air can enter the system and effect the operation unless a bleed protection is provided. In the fuel system shown in U.S Pat. No. 3,363,762 a pair of check valves are located in the fuel system to control the flow of fuel into and out of a filter housing. This system is adequate for some operations, however, a drop in fluid pressure in the fuel occurs due to the force required to overcome the resilient members in the check valves. In addition, this drop in pressure across the fuel filter may be misinterpreted as a reduction in flow through the filter such that the filter should be replaced earlier than necessary. Thus, it is important that flow through the filter is unrestricted and any drop or change in the fluid pressure from the inlet port to the outlet port is the result of retention of material in the filter.

When a fuel filter is replaced it is important that fuel does not spill on the engine. On most engines, the fuel filter can be located such that gravity assures that when the filter is removed that any fuel in the filter does not splash or drop onto the engine. However, on engines located on helicopters and some aircrafts, the fuel filter may be located on the top of the engine. Should fuel from such top located fuel filter spill on the engine, it may cause a fire.

In the present invention, a fuel system has a filter arrangement wherein fuel flow through the filter is unrestricted by first and second valves that control the flow of fuel from a bore through an outlet port and into the bore through an inlet port. A cartridge in the filter arrangement engages a lever to supply a linkage with an input force to move the first and second valves to an opened position on its insertion into the bore. A sensor in the fuel system supplies a monitor with an indication of the condition of the element in the cartridge of the fuel filter. When the pressure drop across the fuel filter reaches a predetermined level, an indicator informs an operator that flow through the fuel filter is restricted and the filter should be replaced. In fuel systems which include a bypass feature, minimum flow of fuel to a regulator continues eventhough flow through the element in the cartridge of the fuel filter may be restricted.

In replacing the element in the cartridge, a rotative force is applied to the cartridge to overcome a primary friction lock and a secondary detent locking member, integral with the lever connected to the first and second valves, that aid in preventing vibrations from loosening the cartridge such that a leak path could be created that would allow fuel to escape from the fuel system. Partial removal of the cartridge allows a resilient member to move and sequentially close the first and second valves associated with the inlet port from the source of fuel and the outlet port to the regulator. When the inlet and outlet ports are closed, the rotative force is halted and an outlet drain is opened along with a vent port to allow fuel in the bore and element to flow to a storage container. After the fuel in the bore has been removed, the rotative force is again applied to remove the cartridge from the bore. The element in the cartridge is replaced and the cartridge reinserted in the bore. As the end of the cartridge approaches the bottom of the bore, the end engages the lever to supply the linkage with a force to sequentially move the valves and open the outlet port and inlet port. In addition, the removal of the cartridge allows the indicator to be reset and terminate the restricted filter signal to the monitor.

It is an object of this invention to provide a fuel system with a filter arrangement having valve means that sequentially isolate a bore from a source of fuel and a regulator and thereafter permit any fuel in the bore to be communicated to a storage chamber prior to the removal of a cartridge element.

It is a further object of this invention to provide a fuel system with a filter arrangement that substantially eliminates the possible communication of fuel to the surrounding environment on removal of a cartridge from a filter housing.

It is a further object of this invention to provide a filter arrangement for a fuel system with primary and secondary retention means that prevents the loosening of a cartridge through vibrations.

An advantage of the invention occurs in that fuel is not splashed or leaked onto a surface of an engine which could later cause a possible fire.

Figure 4:
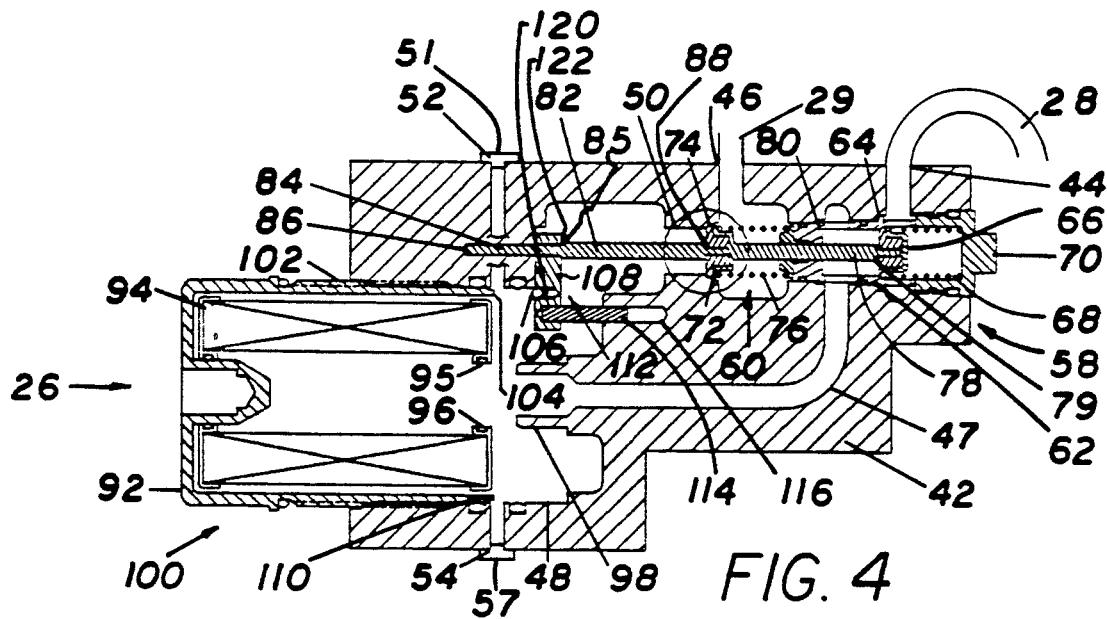
Figure 3:
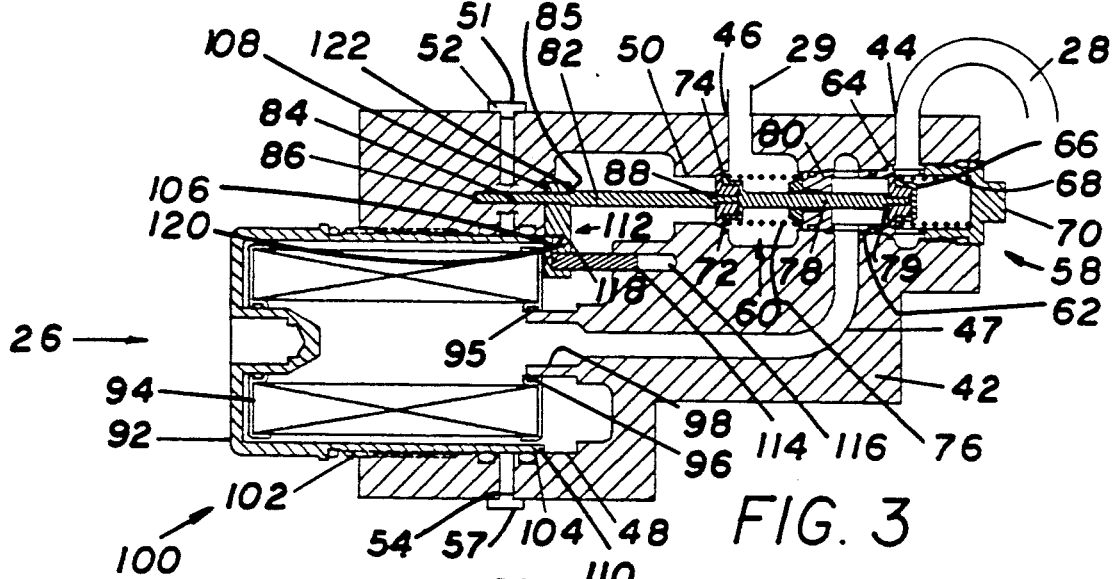
Figure 2:
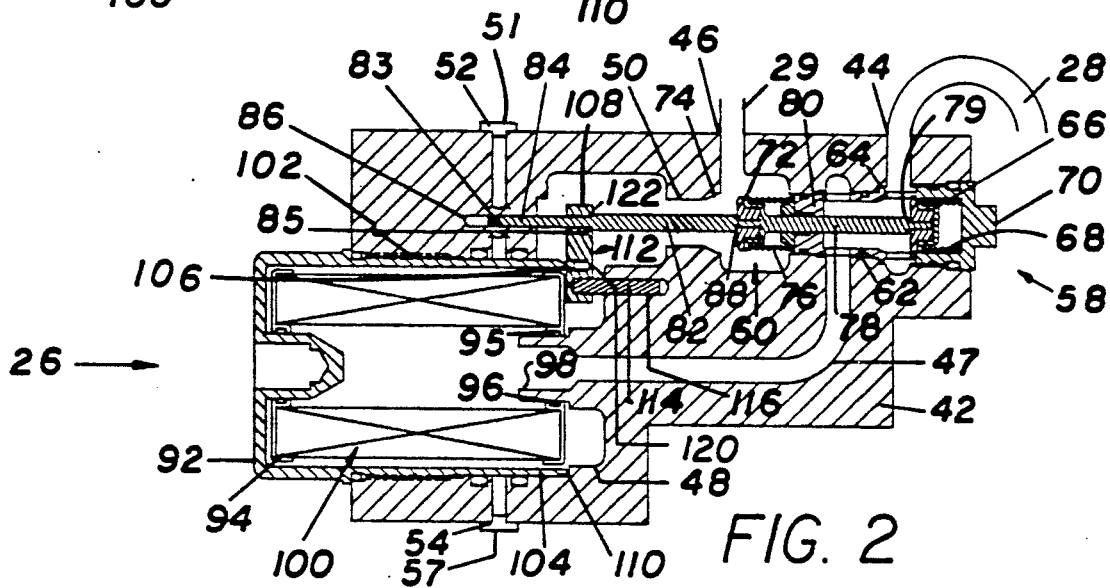

.These objects and advantages should be apparent from reading this specification while viewing the drawings wherein:

FIG. 1 is a schematic illustration of a fuel system wherein a filter arrangement made according to the present invention could be utilized; and FIG. 2 is an enlarged sectional view of the filter arrangement of FIG. 1 with its components in their normal operating position; and FIG. 3 is an enlarged sectional view of the filter arrangement of FIG. 1 with the cartridge element partially removed to a position where valves close the outlet and inlet ports to the bore of the filter housing; and FIG. 4 is an enlarged sectional view of the filter arrangement of FIG. 1 with the cartridge element removed to a position where a drain port is opened to communicate fuel to the bore of the filter housing to a storage reservoir prior to the removal of the cartridge from the filter housing; and FIG. 5 is an enlarged view of the inscribed area 5 of FIG. 4 showing a connection in the linkage between the valves.

In the fuel system 10 shown in FIG. 1, fuel from a source or reservoir 12 is supplied to a regulator 14, of the type disclosed in U.S. Pat. No. 4,245,462, by a pump 16. The regulator 14, in response to an operational input from a computer 18, allows fuel from the pump 16 to be communicated to the combustion chamber 20 in a turbine engine 22. The fuel that is supplied to the combustion chamber 20 is ignited and provides the force for rotating a turbine 24 within the engine 22 to create power which moves an aircraft.

Operational parameters in the engine 22 are communicated to the computer 18 which can provide the regulator 14 with a modifying signal to optimize the ratio of fuel to air supplied to the combustion chambers 20. A portion of the fuel supplied to the regulator 14 is diverted to operate the metering valve, governor, and other components in the regulator 14 with any excess fuel being returned to reservoir 12 by return conduit 25.

In order that the components in the regulator 14 and injectors in the combustion chamber 20 operate in an acceptable manner over an extended period of time it is imperative that clean fuel be provided by the fuel system 10. As a result, a filter arrangement 26 is located in supply conduit 29 to remove wax, dirt, water and other contaminates from the fuel prior to the fuel being supplied to the regulator 14. Unfortunately, as the filter arrangement 26 removes contaminates in the fuel supplied to the fuel valve 14 through conduit 28, the fluid pressure $P_s$ from the pump 16 is proportionally reduced to a level $P_f$ for the fuel actually supplied to regulator 14. As long as the fluid pressure $P_f$ is above a predetermined value or level, the fluid regulator 14 operates in a satisfactory manner without any adverse effect on either the operation of the components or the actual fuel supplied to the injectors in the combustion chamber 20.

A sensor or impending filter indicator 30 is connected to conduit 28 and provides the CPU 18 with a signal indicative of the fluid pressure $P_f$ in the fuel actually presented to the regulator 14. When the fluid pressure $P_f$ reaches a predetermined level as determined by the pressure differential between the fluid pressure in conduit 28 and filter bypass conduit 40 which would adversely effect the operation of either the engine 22 or regulator 14, a warning signal is provided to a monitor or display panel 32 to inform the operator that filter arrangement 26 needs to be serviced. If the element 94 in the filter arrangement 26 is not serviced before a predetermined extreme pressure differential occurs, the filter bypass valve 34 will supply unfiltered fuel to the engine 22 to keep the engine operating. If the filter bypass valve 34 opens, an additional warning signal is given to alert the operator that unfiltered fuel was supplied to the regulator 14. If the filter bypass valve 34 did not divert fuel around the filter arrangement 26, it is possible for the fluid pressure in the fuel supplied to filter arrangement 26 to increase to a level where the element 94 in the filter arrangement ruptures and releases contamination to the regulator 14. Since a certain fluid pressure is required to operate the regulator 14, filter bypass valve 34, which is fully described in copending U.S Pat. No. 4,932,204 diverts fuel around the filter arrangement 26 to assure that the fluid pressure $P_f$ of the fuel supplied to a regulator 14 from pump 16 is always above a minimal fluid pressure during operation of pump 16. Once the aircraft is on the ground, maintenance of the aircraft must include service on the filter arrangement 26 in order to have a airworthy aircraft. During maintenance of the filter arrangement 26, it is imperative that fuel is not drained from the fuel system or spilled or splashed onto the engine 22. The present invention for a filter arrangement 26 assures that only a minimum amount of fuel is retained in a cartridge element 94 when it is removed and replaced with a new filter element 94.

The filter arrangement 26 is shown in more detail in FIGS. 2, 3, 4 and 5 has a housing 42 with an inlet port 46 connected to conduit 29 coming from pump 16, an outlet port 44 connected to conduit 28 connected to regulator 14, a passageway or bore 50 that connects the inlet port 46 with a bore 48, a passageway 47 that connects the projection 98 from passageway or bore 48 connected to the outlet port 44, a vent port 52, and a drain port 54 that connects the bore 48 with a storage container 56.

A first valve 60 located in bore 50 controls the flow communication through the inlet port 46 and bore 48 while a second valve 58 controls the flow communication from passageway 47 to the outlet port 44 to conduit 28.

The second valve 58 includes a sleeve member 62 with openings therein that provide a flow path to the outlet port 44 from the passageway 47 and a seat 64. A movable wall or piston 66 located in the sleeve member 62 is urged toward the seat 64 by a spring or resilient member 68. The sleeve member 62 is held in bore by an end cap 70 which also seals the passageway 47 from the surrounding environment.

The first valve 60 includes a movable wall or piston 72 located in bore 50 that is urged toward a seat 74 by a spring or resilient member 76. Piston 72 has a stem 78 that extends through bearing wall 80 on the sleeve member 62 to link or connect piston 72 with piston 66.

A stem 82 has a first end 84 located on a guide surface 86 in housing 42 and a second end 88 connected to piston 72. The second end 88 has a shoulder 90, as best seen in FIG. 5 that is adapted to engage face 73 on piston 72 to move the same away from seat 74 and allow flow communication through inlet port 46.

A cartridge member 92 located in bore 48 has an element member 94 with radial perforations 100 through which fluid is communicated from bore or passageway 50. Fuel is directed through the element member 94 where contamination is retained and out an axial opening 96 on the end thereof through projection 98 to passageway or bore 47. Threads 102 on the peripheral surface of the cartridge member 92 engage threads on the housing 42 to position and provide the primary locking means for holding cartridge member 92 in bore 48. The end 104 of the cartridge member 92 has a series of indentations or detents 110 thereon which are adapted to engage projection or ball 106 on the secondary locking means 112 carried on lever 108.

The lever 108 is located in bore 48 by pin 114 which is located on guide surface 116 in housing 42. The lever 108 has a bore 118 which retains spring 120 and ball 106 of the secondary locking means 112 and an opening 122 through which end 84 of stem 82 extends into guide 86. Lever 108 engages shoulder 85 on stem 84 to provide a force to move the stem 84 and sequentially position valve 58 and 60 within bore 50.

The filter arrangement 26 shown in FIG. 2 illustrates the normal operation in the fuel system 10 when the CPU 18 supplies regulator 14 and pump 16 with an input through which fuel is supplied to the engine 22. Under these conditions, fuel having a fluid pressure $P_s$ enters the filter arrangement 26 through inlet port 46 and freely flows past valve 60 to passageway or bore 50, through perforations 100 on the peripheral surface of element 94 and through the element 94 where any contamination is removed. The fuel flows out the axial opening 96 to projection 98 on passageway 47 to the outlet port 44 for presentation to conduit 28 for delivery to regulator 14.

Sensor 30 which has a chamber with a movable wall 31 having one side exposed to the fluid pressure $P_s$ of the fuel from the pump 16 while the other side is exposed to the fluid pressure $P_f$ of the fuel in conduit 28 after the fuel has passed through the element 94 in the filter arrangement 26. The sensor 30 supplies the CPU 18 with continual information regarding the pressure differential between the fuel supplied from the pump 16 and the fuel delivered to the regulator 14. The pressure differential is an indication of the flow through the element 94 and when a predetermined flow restriction occurs through element 94 the pressure differential is such that movable wall 31 is latched into a fixed position. With wall 31 in the latched position, CPU 18 supplies monitor 32 with a signal which informs the operator of an impending need to replace element 94 in the filter arrangement 26. Should the element 94 become completely clogged or flow therethrough be so restricted to impair the operation of the aircraft, bypass valve 34, as described in U.S. Pat. No. 4,932,205 allows unfiltered fuel to flow through conduit 40 to conduit 28 for presentation to regulator 14. The unfiltered fuel supplied to regulator 14 is adequate to operate engine 22 for a limited time period. However, for normal operation, sensor 30 will be designed to provide CPU 18 with a signal such that element 94 can be replaced before the need for flow through the bypass valve 34 occurs.

Once monitor 32 indicates the occurrence of an undesired flow restriction through element 94, normal aircraft maintenance dictates that element 94 be replaced. A rotative torque is applied to the cartridge 92 to overcome both the resistance to movement by the locking of ball or projection 106 in detents 110 and the threads 102 in housing 42. As shown in FIG. 3, the cartridge 92 is partially removed from bore 48. As cartridge 92 moves out of bore 48, spring 68 moves piston 66 toward seat 64 and spring 76 moves piston 72 toward seat 74. When cartridge 92 is positioned as shown in FIG. 3, piston 66 is positioned on seat 64 and piston 72 is positioned on seat 74 to interrupt fluid communication between conduits 28 and 29. With valves 58 and 60 effectively sealing the inlet port 44 and outlet port 46, bore 48 is isolated from the fuel system 10.

Additional torque is now applied to cartridge 92 to move end 104 past the vent port 52 and drain port 54, as shown in FIG. 4. Closure means plug 57 associated with the drain port 54 is removed to open the drain port 54. Thereafter, and cap 51 removed from vent port 52. Fuel in bore 48 is thereafter communicated by conduit 59 to storage container 56. When all the fuel in bore 48 is drained therefrom, cap 51 is placed in vent port 52, conduit 59 removed from drain port 54 and plug 57 attached to housing 42 to seal drain port 52. Since all or substantially all the fuel has already been drained from bore 48, it is safe to remove cartridge 92 from bore 48 without fear of contaminating the surrounding environment with fuel that could cause a fire when the engine is running and producing heat.

When the cartridge 92 is removed from bore 48, element 94 is replaced and the cartridge 92 is reinserted into bore 48. As threads 102 move into the housing 42, seal 95 surrounding opening 96 engages projection 98 extending from passageway 47 and end 104 engages lever 108. Movement of the cartridge 92 toward the bottom of bore 48 is transmitted through lever 108 to stem 82 to move valves 58 and 60 to an opened position where flow from the inlet port 46 to the outlet port 44 is unrestricted by the position of the pistons 66 and 72 with respect to seats 64 and 74, respectively. It should be noted that lever 108 must move stem 82 a distance to close a gap between the end 88 and piston 72 prior to the opening of valve 58 which allows communication from bore 48 to the inlet port 46 and similarly stem 78 also moves a distance to close a gap between end 79 and piston 66 before opening of valve 58 to allow communication from bore 48 to outlet port 44. This delay in the opening of valves 58 and 60 assures that a fluid seal is achieved between element 94 and passageway 47, and pressure in conduits 28 and 29 do not put strain on the seals of the closure of the plug means 57 of the drain port 54 or end cap 51 of the vent port 52.

Additionally, the removal of cartridge 92 from bore 48 provides access to a linkage 83 for resetting the holding latch on sensor 30. Releasing the holding latch allows the movable wall 31 to be repositioned in a manner as shown in FIG. 1 and send a signal that allows the CPU 18 to supply monitor 32 with a signal to inform the operator that the element 94 in the cartridge 92 has been replaced.

We claim:
1. A filter means for use in a fuel system wherein fuel from a pump is presented to a regulator for distribution to an engine in response to an operator input, the improvement in the filter means comprising:
   a housing having an inlet port connected to said pump, an outlet port connected to said regulator, a first passageway for connecting said inlet port to a bore and a second passageway for connecting said bore to said outlet port, a vent port communicating with said bore and a drain port communicating with said bore;
   a first valve in said housing for controlling the flow of fuel through said inlet port;
   a second valve in said housing for controlling the flow of fuel through said outlet port;
   cartridge means located in said bore having an element member through which said first passageway is connected to said second passageway said element removing any contaminates from fuel as the fuel flows therethrough;
   linkage means in said housing connected to said cartridge means for positioning said first and second valves away from their respective seats such that fuel may freely flow through said inlet and outlet ports when said cartridge means is fully seated in said bore; and
   resilient means connected to said linkage means for moving said first and second valves into engagement with their respective seats to interrupt fluid communication from the bore during initial removal of said cartridge means from said bore to prevent fuel from draining from said fuel system, said vent port and said drain port being located so as to be uncovered by said cartridge upon further removal from said bore opening said vent port and said drain port to allow fuel in said first and second passageways and bore to flow from said drain port to a storage container prior to the complete removal of said cartridge means from said housing.

2. The filter means as recited in claim 1, wherein said linkage means includes:
   a first stem having a first end located in a first guide surface in said housing and a second end connected to said first valve;
   a second stem located between said first and second valves;
   a pin located on a second guide surface in said housing; and
   a lever connecting said pin with said first stem, said cartridge means engaging said lever to move said first stem toward said first valve and said second stem toward said second valve in opposition to said resilient means to sequentially open said outlet port and inlet port.

3. The filter means as recited in claim 2 wherein said lever includes:

locking means for holding said cartridge means in a fixed position within said bore.

4. The filter means as recited in claim 3 wherein said locking means includes:
   a projection extending from said lever;
   a spring acting on an urging said projection toward a stop; and
   detents on said cartridge means which engage said projection, said insertion of the cartridge means in said bore, said spring urging said projection into said detents to resist rotation of said cartridge means in said bore.

5. The filter means as recited in claim 1, further including:
   reset means for providing an indicator with a signal that said cartridge means has been replaced in said bore once a predetermined fluid pressure differential is created between the fuel presented at the inlet port and the fuel supplied to the regulator through the outlet port.

6. The filter means as recited in claim 5 wherein said reset means includes:
   means for supplying an indicator system of the removal and replacement of said cartridge means.

7. The filter means as recited in claim 6 further including:
   cap means for sealing said vent port, said cap means being removed to allow fuel in said bore to freely flow through said drain port to the storage container.

8. The filter means as recited in claim 7 further including:
   closure means connected to said housing for controlling the flow of fuel through the drain port.

* * * * *